US006531712B1

(12) United States Patent
Boecking

(10) Patent No.: US 6,531,712 B1
(45) Date of Patent: Mar. 11, 2003

(54) VALVE FOR CONTROLLING FLUIDS

(75) Inventor: Friedrich Boecking, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 159 days.

(21) Appl. No.: 09/807,640

(22) PCT Filed: Aug. 1, 2000

(86) PCT No.: PCT/DE00/02536

§ 371 (c)(1),
(2), (4) Date: Apr. 16, 2001

(87) PCT Pub. No.: WO01/14732

PCT Pub. Date: Mar. 1, 2001

(30) Foreign Application Priority Data

Aug. 20, 1999 (DE) ........................................ 199 39 523

(51) Int. Cl.[7] ................................................ F16K 31/00
(52) U.S. Cl. ...................... 257/57; 251/58; 251/129.06; 251/129.2
(58) Field of Search ....................... 251/57, 58, 129.06, 251/129.2

(56) References Cited

U.S. PATENT DOCUMENTS 4,022,166 A 5/1977 Bart
4,971,288 A * 11/1990 Tanner et al. ................. 251/57
5,129,489 A * 7/1992 Majima et al. ................ 25/57
5,209,453 A * 5/1993 Aota et al. ............. 251/129.06
5,417,142 A * 5/1995 Lohmann ............... 251/129.06

FOREIGN PATENT DOCUMENTS

DE 197 24 637 A 12/1998
EP 0 477 400 A1 4/1992
EP 0 790 402 A 8/1997
FR 2 787 144 A 6/2000
WO 99 17014 A 4/1999

* cited by examiner

*Primary Examiner*—Gene Mancene
*Assistant Examiner*—John Bastianelli
(74) *Attorney, Agent, or Firm*—Michael J. Striker

(57) ABSTRACT

A valve for controlling fluids is proposed, which has a piezoelectric actuator (5) and a hydraulic pressure intensifier which transmits the stroke of the piezoelectric actuator (5). The hydraulic pressure intensifier has a pressure chamber (7) and a piston element (10) with a transmission surface area (12). The hydraulic pressure intensifier can actuate a valve member (18) that is connected to the piston element (10). A mechanical pressure intensifier is interposed between the hydraulic pressure intensifier and the valve member (18).

8 Claims, 2 Drawing Sheets

VALVE FOR CONTROLLING FLUIDS

PRIOR ART

Figure 1:
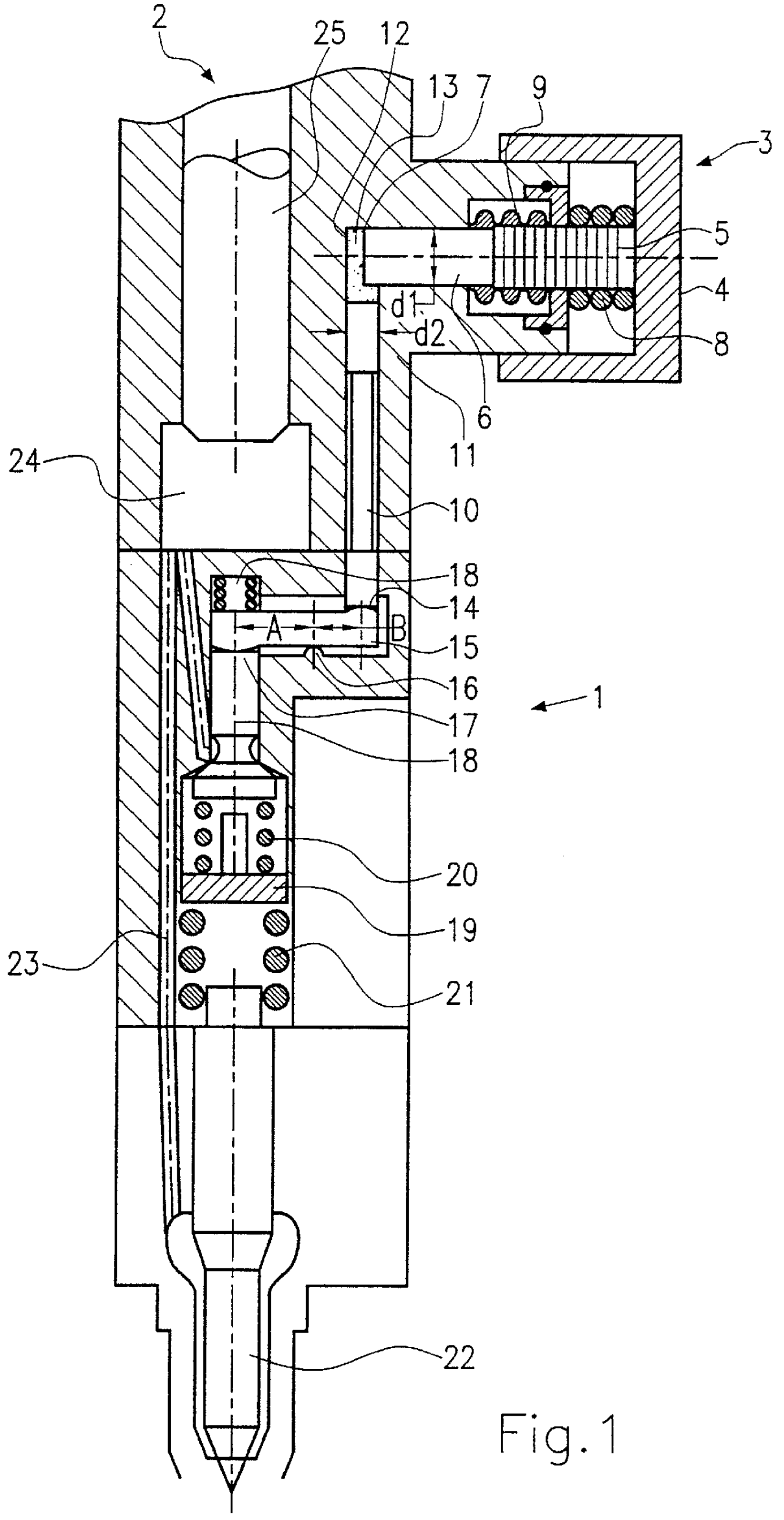

The invention relates to a valve for controlling fluids.

EP-0 477 400 A1 describes a valve of this kind in which an actuating piston of the valve member is movably disposed in a stepped bore of the valve housing, in a small diameter part of the stepped bore. A larger piston that can be moved by means of a piezoelectric actuator is disposed in a larger diameter part of the stepped bore. A hydraulic chamber filled with a pressure medium is disposed between the two pistons so that a movement of the piezoelectric actuator is hydraulically transmitted. This means that when the larger piston is moved a certain distance by the piezoelectric actuator, the actuating piston of the valve member executes a stroke that is enlarged by the transmission ratio of the piston diameter because the piston of the piezoelectric actuator has a larger surface area than the actuating piston of the valve member. In this connection, the valve member, the actuating piston of the valve member, the piston moved by the piezoelectric actuator, and the piezoelectric actuator are disposed in series on a common axis.

In valves of this kind, there is the problem that a higher transmission ratio, e.g. approximately 1:8, can only be achieved with correspondingly high error tolerances since external influences such as temperature increase in the engine compartment or also losses in the pressure medium, as error components, have a very strong influence on the transmission ratio.

For a long while now, divided hydraulic pressure intensifiers have been used to prevent this problem when there is a high transmission ratio. In these divided hydraulic pressure intensifiers, two hydraulic pressure intensifiers are connected in series so that their transmission ratios can be added. As a result, each individual hydraulic pressure intensifier has lower demands placed on it so that even with external influences, the preset transmission ratio, approximately 1:8, is nevertheless maintained. On the other hand, these divided hydraulic pressure intensifiers have turned out to be susceptible to oscillation to which in turn leads to imprecision.

ADVANTAGES OF THE INVENTION

The valve according to the invention, has the advantage over the prior art that the combination of hydraulic and mechanical pressure intensifiers solves the oscillation problem in a simple form since the hydraulic pressure intensifier no longer has to be divided. At the same time, the hydraulic pressure intensifier performs the temperature compensation between the piezoelectric actuator and the housing so that the temperature change disadvantages which are common with purely mechanical pressure intensifiers can be compensated for. Consequently, the valve for controlling fluids according to the invention can be used to achieve a uniform reproducibility of injections so that precisely defined injection times and/or injection quantities of fuel can be assured. Furthermore, a mechanical pressure intensifier is simply designed and can be inexpensively produced so that advantages that pertain to it can also be achieved with regard to a second hydraulic pressure intensifier. Moreover, the mechanical pressure intensifier does not have any problems due to contamination of hydraulic fluid so that the maintenance costs with regard to a second hydraulic pressure intensifier are considerably reduced.

In a particularly advantageous embodiment, the mechanical pressure intensifier can have a lever which transmits the stroke of the piston element to the valve member. Levers can be simply designed and inexpensively produced and result in a rugged embodiment of the valve.

The lever is advantageously supported on a support which divides the lever into two lever arms. In a simple form, this presents the possibility of adapting the transmission ratio to the corresponding preset conditions. At the same time, the cooperation of the lever and support can achieve a precise transmission of the stroke of the piezoelectric actuator onto the valve member. In this connection, a lever arm length ratio of 4:1 has turned out to be particularly advantageous.

The piston element is preferably embodied as a push rod. In the field in question, push rods are standard components which can be simply and inexpensively produced.

In the valve for controlling fluids according to the invention, the transmission surface area of the push rod and the associated surface area of the piezoelectric actuator produce a transmission ratio of 2:1. This low transmission ratio of the hydraulic pressure intensifier assures a low oscillation susceptibility of the hydraulic pressure intensifier. On the other hand, this transmission ratio is added to the predetermined lever arm length ratio of 4:1, resulting in a total transmission ratio of 8:1 so that the desired transmission ratio is achieved without oscillation problems.

In addition, in the valve for controlling fluids according to the invention, a piston associated with the piezoelectric actuator can be disposed between the pressure chamber and the piezoelectric actuator. On the one hand, this piston transmits the longitudinal expansion from the piezoelectric actuator to the push rod and on the other hand, prevents the piezoelectric actuator from coming into contact with the hydraulic fluid. In order to further improve this seal between the piezoelectric actuator and hydraulic fluid, the transition region between the piezoelectric actuator and the associated piston in sealed with a sealing element.

DRAWINGS

Two exemplary embodiments of the invention are shown in the drawings. The exemplary embodiments will be explained in detail in the subsequent description FIG. 1 is a schematic sectional view of a fuel injection valve according to a first exemplary embodiment of the invention; and FIG. 2 is a schematic sectional view of a fuel injection valve according to a second exemplary embodiment of the current invention.

DESCRIPTION OF THE EXEMPLARY EMBODIMENTS

Figure 2:
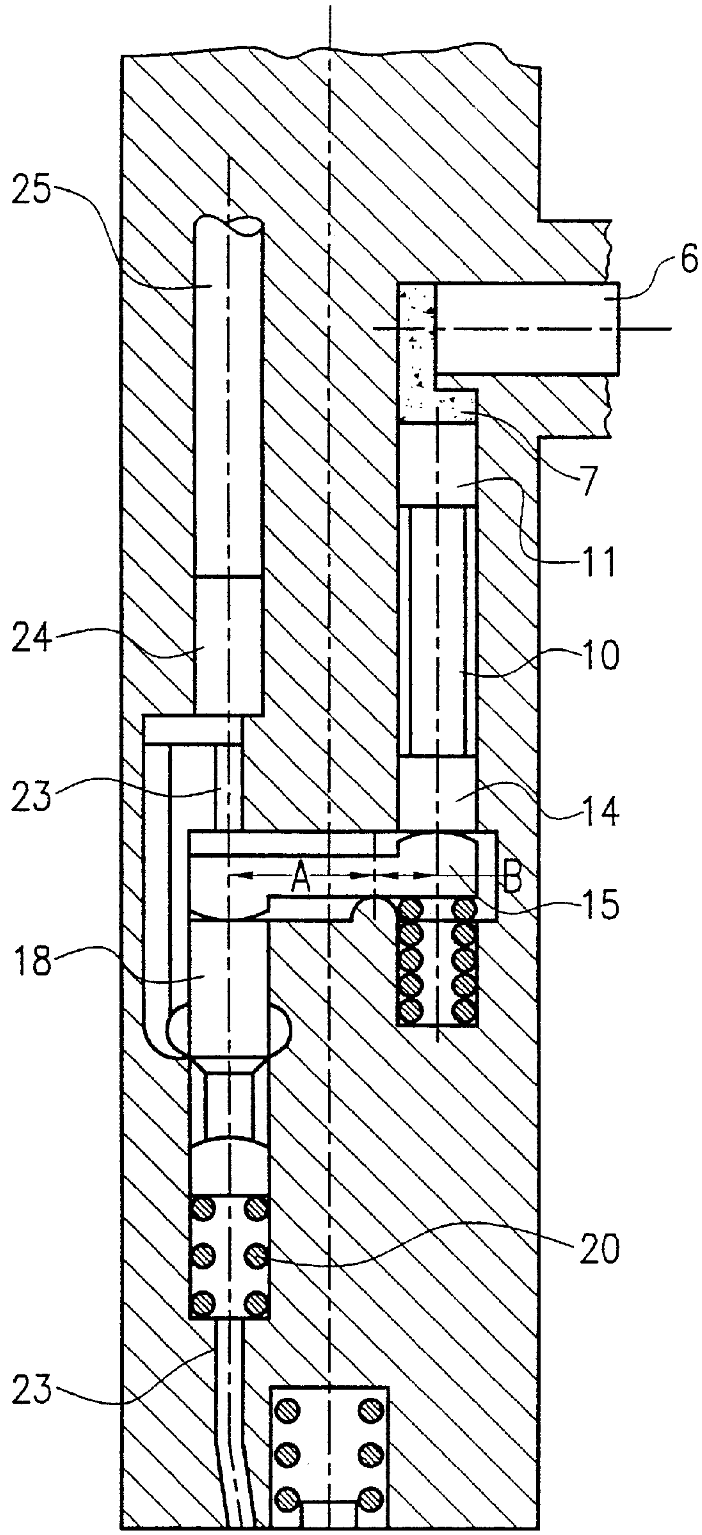

In the first exemplary embodiment shown in FIG. 1, the valve according to the invention is used in an injection system in which the injection pump and the injector constitute a unit (a so-called unit injector system (UIS)). An injection system of this kind is shown in FIG. 1. The injection valve 1 is comprised of a pump unit 2 and a control unit 3. The control unit 3 includes a piezoelectric actuator 5 disposed in a housing 4. The piezoelectric actuator 5 communicates with a hydraulic pressure chamber 7 via a piston 6. In this connection, the piezoelectric actuator 5 is prestressed toward the housing 4 by a prestressing spring 8; a sealing element 9 is disposed at the transition region between the piston 6 and the piezoelectric actuator 5 in such a way that the piezoelectric actuator is not exposed to the fluid in the hydraulic pressure chamber 7.

In FIG. 1, a push rod 10 with an end region 11 adjoins the pressure chamber 7 at a 90° angle to the piston 6. In this connection, the push rod 10, the pressure chamber 7 and the piston 6, constitute the hydraulic pressure intensifier. The transmission ratio results from the ratio of the transmission surface area 12 of the push rod 10 and the transmission surface area 13 of the piston 6. Instead of the area ratio between the two surface areas 12 and 13, naturally the respective diameter d1 of the piston 6*a* and the diameter d2 of the push rod 10 can also be used. A transmission ratio of 1:2 from the piston 6 to the push rod 10 has turned out to be particularly advantageous in this connection. In addition, the longitudinal planes of the piston 6 and the push rod 10 do not have to be at right angles to each other, but can also be aligned with each other or enclose other angles, depending on space conditions.

The bottom end 14 of the push rod 10 in FIG. 1 contacts a spherical surface of a lever 15. The lever 15 rests against a support 16 of the housing 4 and by means of this support, is divided into a short lever arm B and a long lever arm A. In this connection, the lever 15 of the mechanical pressure intensifier and the two lever arms A, B determine the transmission ratio. A transmission ratio of 4:1 has turned out to be particularly preferable.

The second end 17 of the lever 15 is prestressed toward a control valve 18 by a spring 18 and is disposed in the open position when the piezoelectric actuator 5 is in.the rest state and in the corresponding rest state of the piston 6, the push rod 10, and the lever 15.

In FIG. 1, the control valve 18 is adjoined in the usual manner by another piston 19, together with two springs 20 and 21 and a nozzle 22. In addition, a high-pressure bore 23 is also provided for supplying the nozzle 22 with the pressure, which is built up in a control chamber 24 by a piston 25, which is in turn driven by a cam that is not shown.

OPERATION

When the piezoelectric actuator 5 of the valve 1 for controlling fluids according to the invention is triggered, the longitudinal expansion of the piezoelectric actuator 5 is transmitted via the piston 6 by means of the hydraulic fluid in the pressure chamber 7 to the push rod 10, approximately at a ratio of 1:2. This translated longitudinal expansion is then transmitted from the push rod 10 to the end 14 of the lever 15 and is transmitted in turn from the second end 17 of the lever 15 to the control valve 18. In this connection, the transmission ratios of the hydraulic pressure intensifier and the mechanical pressure intensifier are added, i.e. the preferred values of approximately 1:2 in the hydraulic pressure intensifier and approximately 1:4 in the mechanical pressure intensifier result in a total transmission ratio of 1:8.

The embodiment of the valve for controlling fluids according to the invention shown in FIG. 2, which has a piezoelectric actuator 5, differs from the one in FIG. 1 by virtue of the fact that in FIG. 2, instead of the left end 17 of the lever 15 as in FIG. 1, the right end 14 of the lever 15 is prestressed by the spring 18 in the rest state. In addition, the springs 20 and 21 are spatially separated from each other and the fuel line 23 does not extend directly from the pressure chamber 24 to the nozzle, but extends to the nozzle in turn after the control valve 18. Despite these structural differences, however, the exemplary embodiment according to FIG. 2 operates in the same way and has the same interplay between the hydraulic and mechanical pressure intensifiers as in the first exemplary embodiment from FIG. 1.

The current invention can naturally also be used in differently embodied valves with hydraulic and mechanical pressure intensifiers.

The above description of exemplary embodiments according to the current invention is only intended for illustrative purposes and not for limitation of the invention. Within the scope of the invention, various changes in modifications are possible without leaving the scope of the invention or its equivalents.

What is claimed is:

1. A valve (1) for controlling fluids, having a piezoelectric actuator (5) and a hydraulic pressure intensifier which transmits the stroke of the piezoelectric actuator (5), wherein the hydraulic pressure intensifier has a pressure chamber (7) and a piston element (10) with a transmission surface area (12) and the hydraulic pressure intensifier can actuate a valve member (18) that is connected to the piston element (10), characterized in that a mechanical pressure intensifier is interposed between the hydraulic pressure intensifier and the valve member (18).

2. The valve for controlling fluids according to claim 1, characterized in that the mechanical pressure intensifier has a lever (15) which transmits the stroke of the piston element (10) to the valve member (18).

3. The valve for controlling fluids according to claim 2, characterized in that the lever (15) is supported on a support (16), which divides the lever (15) into two lever arms (A, B).

4. The valve for controlling fluids according to claim 3, characterized in that the lever arm (A, B) has a lever arm length ratio of 4:1.

5. The valve for controlling fluids according to claim 1, characterized in that the piston element (10) is embodied as a push rod.

6. The valve for controlling fluids according to claim 5, characterized in that the transmission surface area (12) of the push rod (10) and the associated surface area (13) of the piezoelectric actuator (5) produce a transmission ratio of 2:1.

7. A valve for controlling fluids according to claim 1, characterized in that a piston (16), which has a surface (13) and is associated with the piezoelectric actuator (5), is disposed between the pressure chamber (7) and the piezoelectric actuator (5).

8. The valve for controlling fluids according to claim 7, characterized in that a sealing element (9) seals the transition region between the piezoelectric actuator (5) and the associated piston (6).

* * * * *